United States Patent [19]
Welch

[11] Patent Number: 4,470,716
[45] Date of Patent: Sep. 11, 1984

[54] FASTENER CLIP WITH SLIP-PROOF LOCKING FEATURE, JOINT STRUCTURE USING SAME AND METHOD FOR MAKING SAME

[75] Inventor: Montgomery J. Welch, Spring Lake, Mich.

[73] Assignee: Modular Systems, Inc., Fruitport, Mich.

[21] Appl. No.: 383,350

[22] Filed: Jun. 1, 1982

[51] Int. Cl.³ .............................................. F16B 12/22
[52] U.S. Cl. .................................... 403/254; 403/316; 403/407; 72/379; 248/223.1; 52/584
[58] Field of Search ............ 52/584; 248/223.1, 221.3, 248/73; 403/254, 407, 316, 317; 72/379

[56] References Cited

U.S. PATENT DOCUMENTS

| | | |
|---|---|---|
| 735,618 | 8/1903 | Tannewitz ................. 403/409 X |
| 1,351,119 | 8/1920 | Ogden . |
| 1,533,724 | 4/1925 | Clarke-James . |
| 1,940,969 | 12/1933 | Randall . |
| 2,245,751 | 6/1941 | Blackmore . |
| 2,278,708 | 4/1942 | Miller . |
| 2,708,292 | 5/1955 | Budai . |
| 2,882,110 | 4/1959 | Mutchnik . |
| 3,125,316 | 3/1964 | Wilmhoff ................ 248/223.1 X |
| 3,159,440 | 12/1964 | Courtwright . |
| 3,178,775 | 4/1965 | Tassell . |
| 3,178,987 | 4/1965 | Reese et al. . |
| 3,239,988 | 3/1966 | Meyer . |
| 3,270,995 | 9/1966 | Shears . |
| 3,288,192 | 11/1966 | Bollinger . |
| 3,297,916 | 1/1967 | Wright . |
| 3,430,674 | 3/1969 | Forbush . |
| 3,451,362 | 6/1969 | Ostling et al. . |
| 3,491,820 | 1/1970 | Ostling . |
| 3,634,983 | 1/1972 | Welch . |
| 3,645,162 | 2/1972 | Welch . |
| 3,755,979 | 9/1973 | Pantazi . |
| 3,894,377 | 7/1975 | Welch . |
| 3,996,718 | 12/1976 | Welch . |
| 4,178,047 | 12/1979 | Welch . |

FOREIGN PATENT DOCUMENTS

| | | |
|---|---|---|
| 18875 | 7/1904 | Austria . |
| 163663 | 12/1948 | Austria . |
| 712235 | 3/1968 | Belgium . |
| 0007397 | 2/1980 | European Pat. Off. . |
| 921406 | 12/1954 | Fed. Rep. of Germany . |
| 1349422 | 12/1962 | France . |
| 1399609 | 3/1964 | France . |
| 380908 | 9/1964 | Switzerland . |

OTHER PUBLICATIONS

"Mod-eez-Flexible Joint Structural Fastening System", Modular Systems, Inc., Fruitport, Michigan, 49415, Aug. 1980.
Furniture Production Magazine, Aug. 1968, p. 59.
Furniture Methods & Materials, Apr. 1976, p. 21.
Catalog, Hafele KG, Nagold, W. German, Feb. 1980, "Bed Fittings".
Catalog p. 56, Selby Furniture Hardware Company, "Knockdown Fittings".

*Primary Examiner*—Cornelius J. Husar
*Assistant Examiner*—Joseph A. Fischetti
*Attorney, Agent, or Firm*—Price, Heneveld, Huizenga & Cooper

[57] ABSTRACT

A slippage preventing locking furniture fastener, method of making same, and a joint structure which includes a flexible locking clip and shouldered screw. The clip has a raised central portion having an inclined slot therein which is connected to a furniture piece by securing flanges. An internal locking flange extends at an upward angle toward the raised central portion and terminates below the slot, adjacent the head of a shouldered screw received in a seating area. The free end of the locking flange is wider than the slot to prevent the locking flange from passing through the slot or allowing the joint to loosen, even when substantial force is applied to the joint including the clip.

A method for forming the clip is also disclosed including cutting a configured tab in a metal blank and bending the blank. The bending includes positioning the tab as a locking flange with its free end adjacent a narrower slot portion in a raised central portion. The slot is defined by at least a portion of the outline of the configured tab.

20 Claims, 18 Drawing Figures

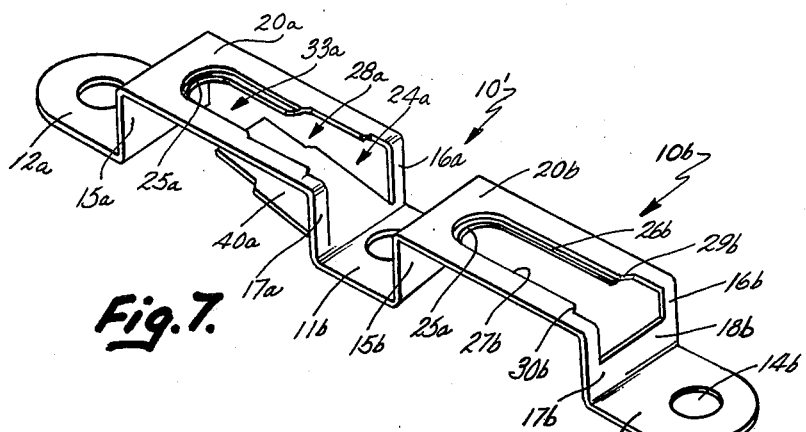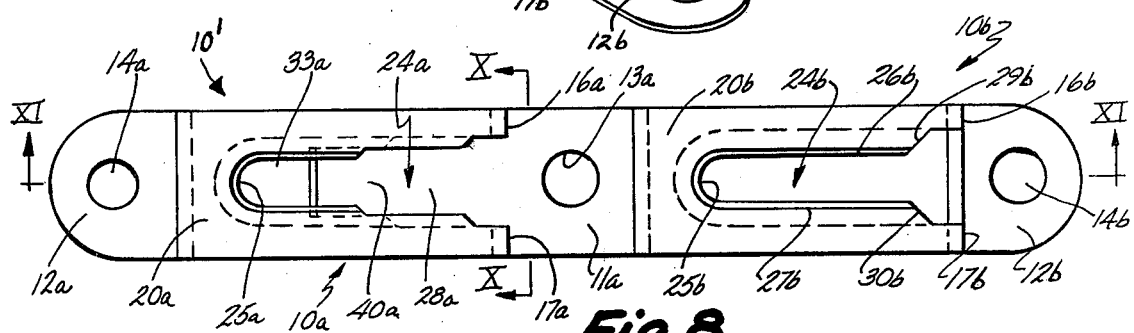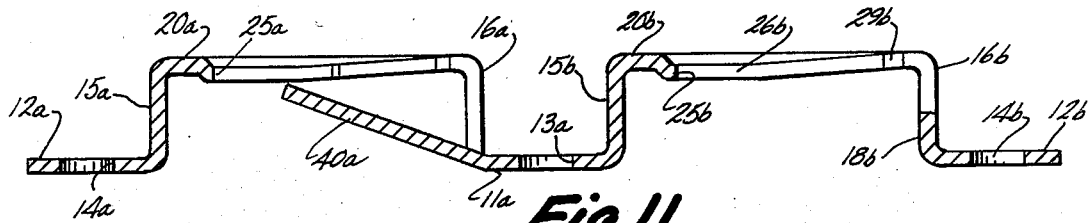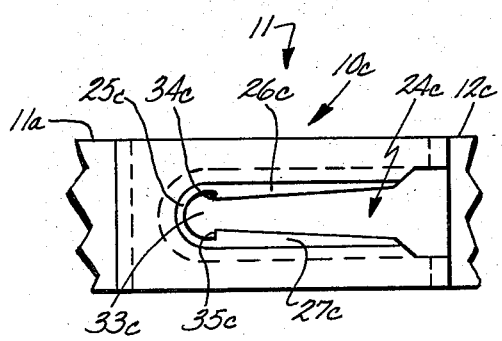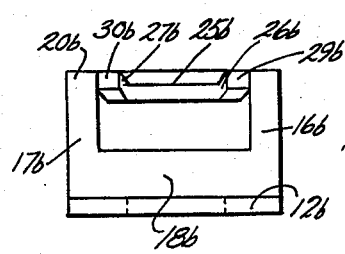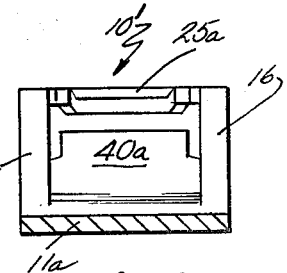

FASTENER CLIP WITH SLIP-PROOF LOCKING FEATURE, JOINT STRUCTURE USING SAME AND METHOD FOR MAKING SAME

BACKGROUND OF THE INVENTION

This invention relates to locking flexible joint structures and fastener clips therefor, as well as to methods for making such clips.

Many joints, such as between modern furniture parts, are now fastened together by concealed mechanical connectors. Many of these concealed fasteners employ key hole-type slots and stud-like fasteners. Generally, this type of furniture fastening system includes short recessed areas along the edges of furniture members to be joined together. Fasteners or clips are mounted within the recessed areas of one furniture piece and studs are mounted on the other. The fasteners slidably engage the head of the studs in a slot, then seat the stud to firmly engage the separate furniture members.

In one prior form of such fasteners or clips, a flexible, rectilinear locking flange on the fastener is positioned so as to abut the stud when it is in a seated position. As the stud passes through the slot, the stud deflects the locking flange allowing the stud to reach its seated position. The locking flange then snaps back into position and thereby prevents the stud from being removed from the slot. Examples of such locking fasteners and furniture fastening systems are shown in U.S. Pat. No. 3,491,820 invented by E. J. Ostling, entitled FLEXIBLE JOINT STRUCTURE AND CLIPS THEREFOR, and U.S. Pat. No. 3,996,718 invented by R. M. Welch entitled FASTENING APPARATUS FOR PANELS. These fasteners function well and provide a permanent, yet concealed connection of furniture parts for environments which so require, such as in applications prone to vandalism.

Normally, this type of locking fastener clip is manufactured from a flat sheet metal blank in which the slot is cut, then the fastener bent to the desired configuration. Excess material which had previously filled the slot provides the locking flange. When so produced, the locking flange has the same configuration and width as the slot, with the exception that the end of the locking flange has been cut to a straight edge.

In certain applications, a slippage problem has been encountered with this prior type of locking fastener. When the joint formed by such a fastener is subjected to enough force or pressure, the locking flange is forced against the stud head in the slot. Continued pressure on the joint forces the locking flange to bend and slip along the side of the stud head toward the slot. Since the locking flange is the same width as the slot, the locking flange is pushed up through the slot and urged underneath the head of the stud in a wedge-like fashion, particularly when the fastener is used on a wood joint. This results in considerable play in the joint, and the joint is loose, sloppy and substantially weakened.

Accordingly, a need existed for a fastener clip and joint incorporating same which could withstand stresses and forces without slipping, loosening and/or weakening. However, it was desired that such clip not be complicated or expensive, be susceptible of rapid, mass production, yet be strong and durable.

SUMMARY OF THE INVENTION

Therefore, the present invention provides a locking fastener clip which provides a strong, durable, solid and slip-proof connection for a joint structure.

In one embodiment of the invention, there is provided a clip for use in a joint structure. The clip is a one-piece plate and has end flange means for securing the clip in a joint structure. Spaced from the general plane of the flange means is a central portion with joining means for joining the end flange means to the central portion. The central portion has slotted means for receiving the head of a securing stud including a slot with a closed end and seating means for seating the head of a securing stud. Inclined means are included to draw the securing stud downwardly when the stud is moved along the slot toward the closed end. Extending at an angle to the slotted means is a locking flange. The locking flange terminates in a locking end adjacent the seating means at a distance less than the thickness of the securing stud head. The locking end is wider than the width of the slotted means at the seating area. Thus, the securing stud head can depress and pass the locking end as it moves toward the closed slot end, but is prevented from returning past the locking end when moving away from the closed end. Slippage of the locking end through the slot is prevented especially when force or pressure is applied to joint. Slippage in and/or loosening of any joint in which the clip is used is effectively reduced and/or prevented.

In another embodiment, a fastener as described above is combined in a double clip form with a second fastener which lacks a locking flange. A furniture piece carrying this double fastener is engaged by a furniture piece carrying two studs, each stud engaging a slot of one portion of the double fastener. Such a double fastener system prevents pivotal movement about the connecting studs since the double fastener is engaged at two spaced points.

In still another embodiment, the fastener clip includng a widened locking flange as described above is integrally combined in a double clip form with a second, semi-locking fastener which lacks a locking flange. The second fastener has a slot which tapers inwardly from the free end toward the closed end of the slot. The closed end of the slot has widened area for seating a second stud. When a furniture piece carrying this double fastener clip engages a furniture piece carrying two studs, the fastener prevents pivotal movement about the studs as described above, and the tapered slot of the second clip provides an additional locking force to resist movement of the studs out of their respective slots.

The present invention also embodies a novel method for making either a single or double slip-proof locking fastener clip including cutting a configured tab having a free end in a metal blank. The blank is bent to form a securing flange and a raised central portion joined to said securing flange and including a slot defined by the outline of at least a portion of said tab and having a narrow slot portion which is narrower than said free end. The bending also includes positioning the configured tab at an angle to said slot with its free end immediately adjacent said narrow slot portion to form a locking flange.

These and other objects, advantages, purposes and features of the invention will become more apparent

BRIEF DESCRIPTION OF THE DRAWINGS

FIG. 7 is a perspective view of one form of a double fastener clip embodying the present invention;

FIG. 8 is a top plan view of the double fastener clip of FIG. 7;

FIG. 8A is a fragmentary top plan view of another embodiment of a double fastener clip embodying the present invention;

FIG. 9 is an end elevation of the double clip shown in FIGS. 7 and 8;

FIG. 10 is a sectional, end elevation taken along line X—X of the double clip of FIG. 8;

FIG. 11 is a sectional, side elevation taken along line XI—XI of the double clip of FIG. 8;

DETAILED DESCRIPTION OF THE PREFERRED EMBODIMENTS

SINGLE CLIP

Figure 1:
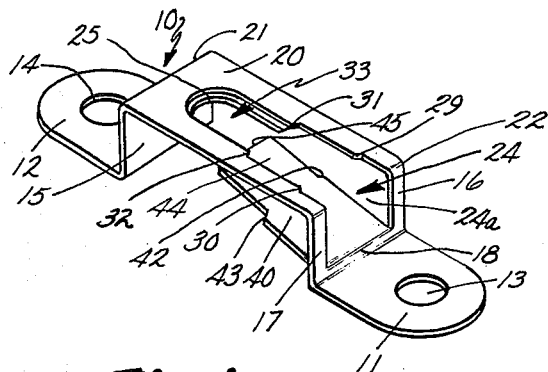
FIG. 1 is a perspective view of a single locking clip embodying the present invention.
Figure 2:
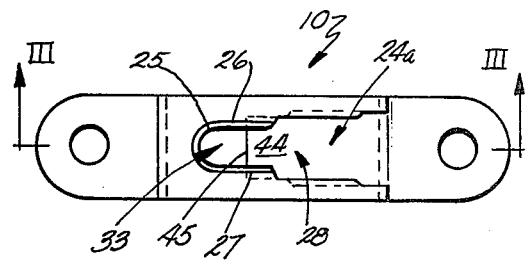
FIG. 2 is a top plan view of the clip of FIG. 1.
Figure 6:
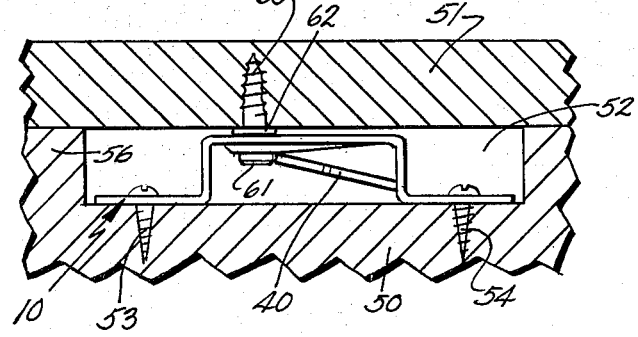
FIG. 6 is a side elevation of a joint structure incorporating the fastener clip of FIGS. 1-5.
Figure 4:
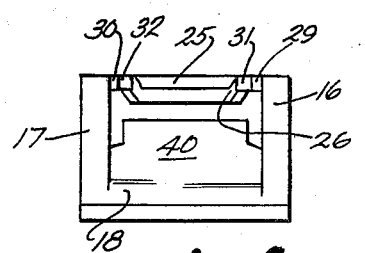
FIG. 4 is an end elevation of the clip of FIGS. 1-3 embodying the present invention.

FIG. 1 illustrates a single locking fastener or clip 10 embodying the present invention. Clip 10 includes a top wall or center portion 20 which is connected to two flanges 11 and 12. A locking flange 40 extends inwardly beneath portion or wall 20 from flange 11 at an angle to top wall 20 and terminates at a point slightly below slot 24 and adjacent the closed end of the slot in top wall 20. As seen in FIG. 6, clip 10 is adapted for mounting within a recess such as that at 52 in a first furniture panel 50, and a shoulder screw or stud 60 is driven into a second furniture panel 51. The head of stud 60 is engaged in slot 24 of clip 10 by passing stud 60 over and depressing locking flange 40. Locking flange 40 snaps back and prevents stud 60 from returning back through the slot in clip 10, providing a rigid joint between the furniture pieces. Of course, clip 10 may also be mounted on the non-recessed surface of a joint member, such as member 51, with the opposing stud in a recess on the opposite joint member, such as recess 52. In such case recess 52 would have to be somewhat longer to allow entry of clip 10 for engagement with the stud.

Clip 10 has end flanges 11 and 12, flange 11 having hole 13 and flange 12 having hole 14. A generally raised central portion or top wall 20 is joined to an upstanding end wall 15 at one end of the clip and two spaced upstanding legs 16 and 17 are provided at the other end. End flange 12 joins the bottom portion of end wall 15. Upstanding legs 16 and 17 are formed integrally with an upstanding wall portion 18 which is joined to end flange 11. A corner 21 is formed between top wall 20 and upstanding end wall 15. A corner 22 is formed between upstanding leg 16 and top wall 20. Still another corner 23 is formed between upstanding leg 17 and top wall 20.

A slot 24 is formed in part by upstanding legs 16 and 17. Slot 24 extends into the central portion of top wall 20 near corner 21. Slot 24 is defined by the top of upstanding wall portion 18, the inside edge of end leg 16, inwardly slanted surface 29, inwardly slanted surface 31, inclined side or wedging flange 26, end receiving portion 25, inclined side or wedging flange 27, inwardly slanted surfaces 30 and 32, and the inside edge of upstanding leg 17. Slot 24 thus has three sections, namely, an opening 24a, which communicates with an enlarged immediate channel 28 which, in turn, communicates with narrow channel 33 located at closed end receiving or seating portion 25.

Narrow channel 33 in the top surface 20 has a downwardly extending wedge portion formed by inclined, parallel wedging flanges 26 and 27. The wedging surfaces slope downwardly toward the plane of flanges 11 and 12 from the enlarged intermediate channel 28 to the closed end 25 of slot 24. The end receiving portion or seating area 25 is parallel to, but spaced downwardly of top wall 20.

Clip 10 has an integrally formed locking flange 40 which is cut from the clip at the time the clip is formed. Locking flange 40 extends from the top of upstanding wall portion 18 and angles upwardly with relation to top wall 20 and slot 24. Locking flange 40 has inwardly slanted surfaces 42 and 43 which reduce the end portion of locking flange 40 to a narrowed area 44. Since locking flange 40 is cut from slot 24 at the time of forming clip 10, narrowed area 44 has a width corresponding to the width of the enlarged intermediate channel 28. The free end of locking flange 40 is cut off to provide a flattened end portion 45 which is also the same width of enlarged intermediate channel 28. After clip 10 is formed, end portion 45 is located slightly below slot 24 and is vertically aligned with one edge of end receiving portion 25, adjacent narrow channel 33. End 45 is spaced below slot 24 by a distance less than the thickness of the securing stud head (see FIGS. 5 and 6).

It is possible to form clip 10 without an upstanding wall portion 18. In that form, locking flange 44 extends from one edge of end flange 11. As in the preferred embodiment, locking flange 40 extends ultimately from end flange 11, but in the revised embodiment, locking flange 40 extends directly from end flange 11 instead of the top edge of upstanding wall portion 18 (see FIG. 11 for example).

DOUBLE CLIPS

In another embodiment, shown in FIGS. 7 through 12, double clip 10' includes a locking clip 10a as described above and is combined with a second clip 10b, which provides for connection of furniture pieces at two spaced points. In this embodiment, a first raised central portion 20a is connected to an end flange 12a and a middle flange 11a. As described above, first central portion 20a is connected to end flange 12a by an upstanding end wall 15a and by two spaced, upstanding legs 16a and 17a at the other end. Top wall 28 carries a slot 24a having an enlarged area opening from the space between legs 17a and 16a, intermediate width channel 28a and a narrow width channel 33a. Locking flange 40a extends directly from the edge of middle flange 11a from which legs 16a, 17a extend and terminates slightly beneath narrow channel 33a at one end of end receiving portion 25a.

A second raised central portion 20b is connected to middle flange 11a and second end flange 12b. The second central portion 20b lays in the same plane as central portion 20a. Central portion 20b is joined to an upstanding end wall 15b at one end and two spaced upstanding legs 16b and 17b at the other end. Upstanding end wall 15b is joined at its bottom portion with middle flange 11a on a side of middle flange 11a opposite to the side to which end legs 16a and 17a are joined. Upstanding legs 16b and 17b are formed integrally with an upstanding wall portion 18b which is joined to end flange 12b, end flange 12b having hole 14b.

A slot 24b is formed, in part, by upstanding legs 16b and 17b. This slot 24b extends into the central portion of top wall 20b. Slot 24b is defined by the top of upstanding wall portion 18b, the inside edge of end leg 16b, inwardly slanted surfaces 29b and 30b, end receiving portion 25b, inclined wedging flanges 26b and 27b, and the inside edge of upstanding leg 17b.

The outer open portion of the slot 24b in the top surface 20b has a downwardly extending wedge portion formed by inclined wedging flanges 26b and 27b. The wedging surfaces slope downwardly toward the plane of flanges 11a and 12b from the open end to the closed end of slot 24b. The end receiving portion 25b is parallel to, but spaced downwardly of top wall 20b.

In still another embodiment of the invention shown in FIG. 8A, a double fastener clip 11 has a locking portion 10a (not shown) as described above, and a second raised central portion 10c having a tapered slot 24c which provides for partial locking of a shoulder screw seated therein. In this embodiment, inclined wedging flanges 26c and 27c which, in addition to sloping downwardly toward the plane of flanges 11a and 12c, taper inwardly toward each other reducing the normal width of slot 24c to a locus of minimum width at 34c and 35c. At this point, the slot width widens abruptly forming an enlarged seating area 33c of increased width terminating at end wall 25c. Wedging flanges 26c and 27c at the locus of minimum width form shoulders 34c and 35c which provide a detent at the end of the slot. The wedging flanges 26c and 27c are cammed apart as securing stud 60 is urged longitudinally from the open end of slot 24c to the closed end. As soon as stud 60 clears the locus of minimum width at shoulders 34c and 35c the sides snap back into their normal position and the stud is locked into place behind the shoulders. This prevents unintentional disengagement of the stud from slot 24c unless sufficient force is generated to force the stud back through shoulders 34c, 35c. Therefore, the second central portion 10c provides additional locking forces for a joint incorporating the double clip.

JOINT STRUCTURES

The joint structure of the preferred embodiment, shown in FIG. 6, includes clip 10, a first panel 50 and a second panel 51. Although furniture panels 50 and 51 are preferably wood members, the joint structure of the present invention can include panels 50 and 51 which are metal members. Recess 52 is cut or formed in the end edge of first panel 50, in which is positioned clip 10. Lip 56 conceals clip 10 when the joint is assembled. Wood screws 53 and 54 are used to attach clip 10 to first panel 50.

A shouldered wood screw or stud 60 is fixed in the side of the second panel 51. The shouldered wood screw 60 has a head 61 and a shoulder 62. The head 61 has means (not shown) such as a slot, for engaging a screw driver so that the shouldered wood screw 60 may be easily fastened in second panel 51.

Figure 3:
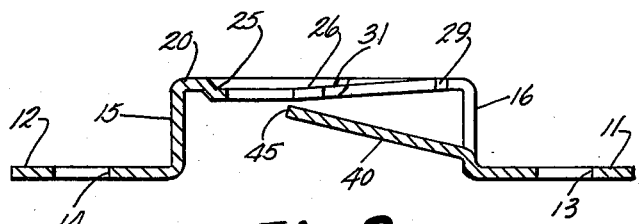
FIG. 3 is a sectional, side elevation of the clip of FIGS. 1 and 2 taken along line III—III of FIG. 2.

The two panels are securely fastened together by inserting head 61 in slot 24. First panel 50 is then forced to the right relative to second panel 51 as seen in FIG. 6. Stud 60 passes through middle channel 28 and then into narrow channel 33, with inwardly slanted surfaces 29, 30, 31 and 32 centering stud 60 as it is shifted in slot 24. The relative movement of stud 60 to the left will force locking flange 40 downwardly until the head 61 reaches the end receiving portion 25. At this point, the flange 40 will return to its normal position as shown in FIG. 3 to lock the wood screw 60 in place within slot 24.

Figure 12:
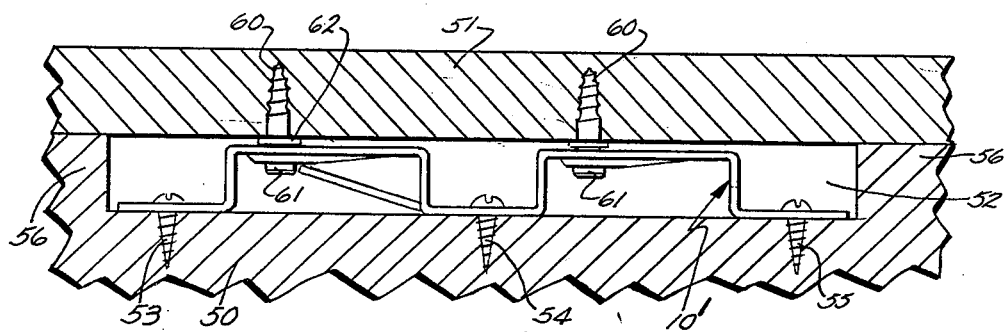
FIG. 12 is a side elevation of a joint structure including the double clip with locking flange of FIGS. 7-11.

In a joint structure of the second embodiment having a double fastener clip 10', shown in FIG. 12, two spaced shouldered screw 60 are fixed in the side of second panel 51. Clip 10' is attached to the bottom of slot 52 by screws 53, 54 and 55, and the two panels are then securely fastened together by inserting one head 61 of a shouldered screw 60 in slot 24a and the other head 61 in slot 24b. As first panel 50 is then forced to the right relative to the second panel 51, wedging surfaces 26a, 27a, 26b and 27b draw both heads 61 of shouldered screws 60 into slots 24a and 24b until the two studs are received in end receiving portions 25a and 25b. Locking flange 40a operates as described above, and the inclined wedging flanges cause first and second panels 50 and 51 to be pulled tightly together.

Since the joint structure is affixed by connecting clip 10' with two shouldered screws 60 located at discrete points, clip 10' cannot pivot around a single shouldered screw 60. The joint is locked together and provides increased support strength.

In the third embodiment making use of tapered, semi-locking slot 24c, the clip and two shouldered screws 60 are assembled as above. When shouldered screw 60 is seated in end receiving portion 25c, the inwardly tapered, inclined wedging flanges 26c and 27c resist withdrawal of head 61 from slot 24c. Therefore, locking flange 40 and wedging flanges 26c and 27c combine to provide a locking force for clip 11 in addition to the locking force provided by the stud in clip portion 10a.

Figure 6C:
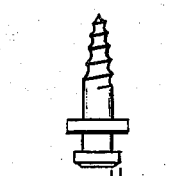
FIG. 6C is a side elevation of a conventional shouldered screw illustrating the amount of slippage which can occur in addition to that shown in FIG. 6B resulting from the difference in diameter between the head of the shouldered screw and its shank portion.
Figure 6A:
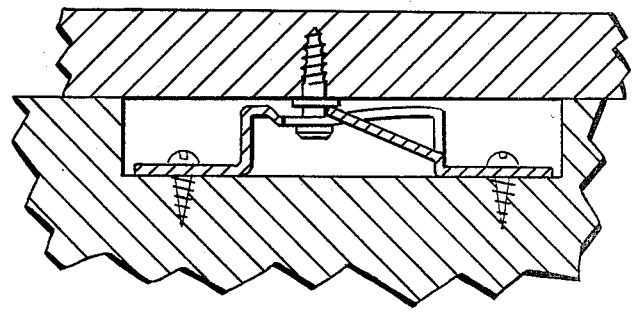
FIG. 6A is a side elevation of a prior joint structure incorporating a conventionally known fastener clip including a conventional locking flange, the joint being shown in slipped position after force is applied thereto, the initial position being shown in phantom.
Figure 6B:
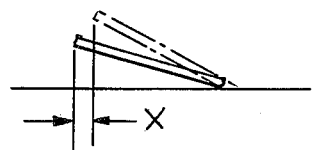
FIG. 6B is a schematic illustration of a portion of the total amount of slippage in the joint resulting from rotation of the conventionally known locking flange as shown in FIG. 6A.

All of the joint structures shown in FIGS. 7 and 12 using any of the above described clips overcome the prior known joint slippage problems described above in the Background of the Invention resulting from application of a force to one member or panel of the joint. As shown in FIGS. 6A, 6B and 6C, if a sufficient force was applied to one of the panels such that the shouldered screw was urged toward the open end of the slot and toward the locking flange, the prior known locking flange was forced tightly against the head of the shouldered screw. If the force was continued, or increased, the end of the locking flange would, in fact, slip upwardly along the side of the head of the shouldered screw and into the annular recess between the head and the collar or shoulder of the shouldered screw against the shank in that recess. The flange thus rotates upwardly when forced in this matter (see FIGS. 6A and 6B) and comes to rest with its end against the shank or neck of the shouldered screw in the corner between that shank and the shoulder or collar of the screw.

As illustrated in FIGS. 6B and 6C, the amount of displacement in the joint when forced in the above manner is actually the sum of the distance X shown in FIG. 6B due to the rotation of the prior known, conventional locking flange, i.e., the projection of the difference in the location of the end of the locking flange, and the distance Y, i.e., the difference in diameter between the head of the shouldered screw and its connecting shank between the head and shoulder or collar. This distance, X+Y from FIGS. 6B and 6C, could actually amount to as much as 0.1 to 0.2 inches depending on the actual dimensions of the joint members. As a result, the shift in the alignment of the joined members was very unsightly, allowed loosening of the joint, and was structurally insecure in certain applications.

The present invention, however, overcomes the above described slippage problem since the end portion 45 of locking flange 40 as shown in FIGS. 7 and 12 is wider than the narrow channel 33. End portion 45 is thus prevented from passing through slot 24 even when significant pressure is exerted against the locking flange 40 by the head 61 of shouldered screw 60. The misalignment, loosening and structural insecurity of the joint is thus prevented because the locking flange cannot pass through the narrow slot portion and holds the screw, and thus both panels of the joint, in the desired position.

As described above, the preferred embodiment of the single clip 10 has an overall length of 1.921 inches, an overall height of 0.356 inches, a spacing of the centers of securing holes 13, 14 of 1.515 inches and is formed from AISI 1050 annealed spring steel having a thickness of 0.05 inches + +0.002. The locking flange is angled 19.5 degrees from the plane of flanges 13, 14 and the narrowed locking area extends 0.25 inches along the length of locking flange 40. The narrow seating area of the slot is 0.17 inches wide, the intermediate area is 0.227 inches wide, and the open end is 0.314 inches wide. Since locking flange 40 is cut from slot 28, the locking flange has a width substantially the same as the corresponding area of the slot, but small losses of material in the cutting process may reduce the width of the locking flange.

The double clip embodiment has an overall length of 3.437 inches, but the remainder of the above dimensions are the same for the locking portion of the double clip.

Figure 5:
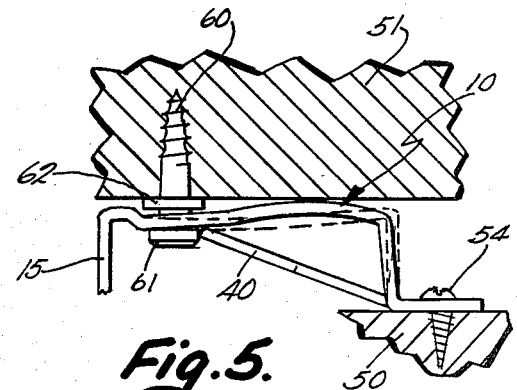
FIG. 5 is a fragmentary, enlarged, side view of a joint structure including the fastener clip of FIGS. 1-4.

The flexible nature of the clip is illustrated in exaggerated fashion in FIG. 5. The weakest portions of the clip are corners 22 and 23. Accordingly, as the force between screw 60 and clip 10 increases, the top wall 20 will tend to bow outwardly as shown in FIG. 5. The dotted lines of FIG. 5 show the normal portion. During this bowing operation, the corners 22 and 23 will give and legs 16 and 17 will flex inwardly. Since upstanding wall 15 and corner 21 are solid members and of a greater width than the total width of upstanding legs 16 and 17, there will be substantially no flexibility of the clip at corner 21 or at upstanding end wall 15. This is a desirable condition since the major load and the strength of the clip resides to a great extent in upstanding end wall 15 and corner 21. Thus, the flexibility of the clip is most remotely spaced from the area of greatest stress where screw 60 resides in the assembled joint. Of course, this flexibility is present in all of the clips described herein including both single and double clips 10, 10' and 11.

The flexible clip of the invention provides a strong clip to securely fasten together joints such as furniture joints. The clip provides sufficient flexibility, however, to permit expansion and contraction of the wood members themselves without losing the securely fastened nature of the joints. In other clips, wherein little or no flexibility is present, the screw can be pulled out of the wood during wood swelling or the joint can become very loose during wood drying.

In some applications first and second panels 50 and 51 can be metal panels, to which clip 10 and stud 60 are attached by metal screws, spot welding or other methods. Additional descriptions of clips and joint structures of this general nature are contained within U.S. Pat. No. 3,491,820 invented by E. J. Ostling and issued Jan. 27, 1970, the descriptions of which are incorporated herein by reference.

METHOD OF MANUFACTURE

Figure 13:
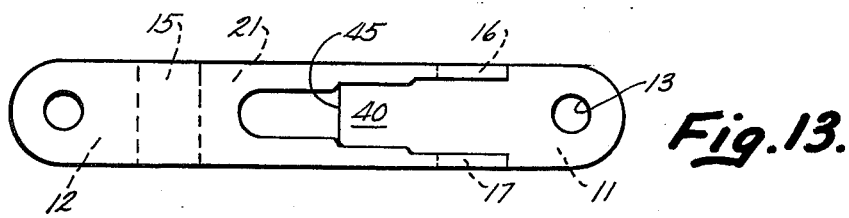
FIG. 13 is a top plan view of a flat metal blank after cutting or stamping and prior to bending into a single fastener clip embodying the present invention.

Single clip 10 is manufactured by first cutting or stamping an elongated clip blank from flat metal stock or flat bars having the proper thickness. The slot 24 and flange holes 13, 14 are then cut or stamped in the flat blank, or can be cut at the same time as the initial cutting step. The process of cutting the slot 24 produces a tab which has a configuration corresponding to that of the slot, and therefore has a narrow free end, an intermediate area and a wide end that connects the tab to the remainder of the blank. As shown in FIG. 13, the narrow free end of the tab is then cut off in order to provide a flattened end portion 45. The narrow free end can also be cut off during the initial slot cutting step. The blank is then bent at right angles by standard metal bending techniques along the transverse, dotted lines in FIG. 13 to form the raised central portion 21, end flanges 11, 12, wall 15 and upstanding legs 16, 17. The locking flange 40 is also bent and positioned to extend at an upward angle from the plane of the end flanges so that the locking end 45 is immediately below slot 24 and is aligned under the narrowed end of slot 24.

Figure 14:
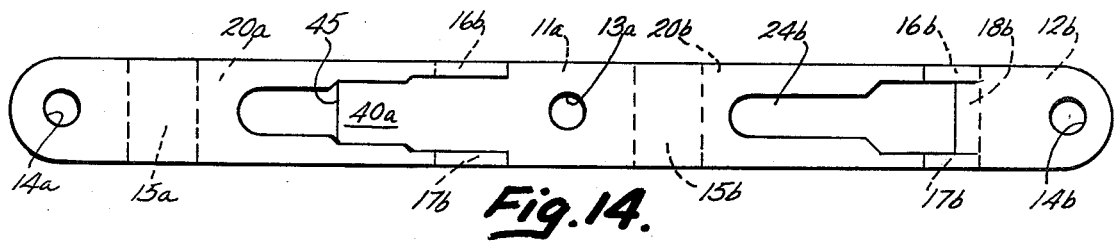
FIG. 14 is a top plan view of a flat metal blank after cutting or stamping and prior to bending into a double fastener clip embodying the present invention.

In forming the double clip, the same steps are followed as described above, with the exception that an elongated blank is used and that, during the slot cutting step, an elongated aperture 24b' is also cut in the elongated blank adjacent the other end of the blank, as shown in FIG. 14. When the blank is bent along the dotted lines in FIG. 14, a second raised central portion 20b and middle flange 11a are bent into the clip. The second central portion is generally in the same plane as the first central portion and the middle flange is disposed between the two central portions as earlier described. Central portion 20b is bent so that the second aperture 24b' is defined by central portion 20d, upstanding legs 16b, 17b and upstanding wall portion 18b, forming slot 24b therein.

It is understood that the above description and drawings are of the preferred embodiment and various changes or modifications can be made without departing from the spirit of the invention embodied therein, such as the use of different materials or a different method of attaching the clip to the furniture panels. Therefore, it would be understood that the embodiments shown in the drawings in the above description are not intended to limit the scope of the invention which is defined by the claims which follow.

The embodiments of the invention in which an exclusive property or privilege is claimed are defined as follows:

1. A clip for use in a joint structure comprising:
   a unitary, one piece plate having an end flange means for securing the clip in a joint structure;
   a first central portion generally in a plane spaced from the general plane of said end flange means, and having joining means for joining said end flange means to said central portion;
   first slotted means for receiving the head of a securing stud in said first central portion, said slotted means including a narrow slot area with a closed end and seating means for seating the head of a securing stud in said slotted means, said slotted means having an intermediate slot area communicative with said narrow slot area, said seating means including a portion of said narrow slot area;
   inclined means for drawing a securing stud downwardly when the stud is moved along the slot toward the closed end; and
   a locking flange integrally formed with said plate and bent to extend rectilinearly generally from said end flange means at an angle to said slotted means, said locking flange terminating at a locking end adjacent said seating means at said narrow slot area and at a distance from said central portion less than the thickness of a securing stud head, said locking end being wider than the width of said narrow slot area but not being wider than the width of said intermediate slot area, whereby the head of a securing stud can depress and pass said locking end of said locking flange as it passes toward said closed end of said slot but is prevented from returning past said locking end when moving away from said closed end such that slippage of the locking end of said locking flange through said slot is prevented and slippage in and/or loosening of any joint in which the clip is used is reduced and/or prevented.

2. A clip as defined in claim 1 wherein said locking end is substantially the same width as said intermediate slot area.

3. A clip as defined in claim 2, said slotted means having a widened slot entrance area communicative with said intermediate slot area, said locking flange having a widened connecting area connecting said locking end to said clip, said connecting area being substantially the same width as said slot entrance area.

4. A clip as defined in claim 1, 2 or 3, further comprising a second central portion in the general plane of said first central portion and having joining means for joining said second central portion to said end flange means; and
   second slotted means for receiving the head of a second securing stud in said second central portion, said second slotted means including a second slot with a closed end and second seating means for seating the head of a second securing stud in said second slotted means.

5. A clip as defined in claim 4, said clip having second inclined means for drawing a second securing stud downwardly when the second stud is moved along the slot toward the closed end; and
   detent means for allowing a second securing stud to be seated in said second seating means but resisting the unseating of the stud from said second seating means.

6. A clip as defined in claim 5, said detent means including wedging means for narrowing the width of said second slot in the direction of said closed end, said wedging means terminating adjacent said second seating means and including shoulders which abut a second securing stud when in said second seating means and resist the unseating of said second stud.

7. A joint structure comprising:
   a first furniture member and a second furniture member having surfaces in contacting relationship;
   said first furniture member having a recessed area along a surface in contact with a surface of said second furniture member;
   a clip fastened to at least one of the surface of said recessed area of said first furniture member and said surface of said second furniture member with said end flange means, said clip being constructed according to claim 1 with said central portion being spaced above the surface to which said clip is fastened;
   a stud member fixed to the other of said surface of said recessed area and said second furniture member, said first stud having an enlarged head extending above and spaced from the surface to which said stud is fastened and juxtaposed to said clip, said stud enlarged head being positioned beneath said central portion within said seating means of said slot so as to lockingly hold said first and second panel members in contact with each other.

8. A clip for use in a joint structure comprising:
   a unitary, one piece metal plate having first and second end flanges, a first central portion generally in a plane spaced from the general plane of either of said end flanges and joined to said first end flange at one end thereof through a first wall member and to said second end flange at the other end thereof through a first pair of spaced upstanding legs forming an opening therebetween;
   a first slot formed in said first central portion, said first slot having a closed end and an open end, said closed end being at a point intermediate the end of said first central portion and said open end extending to and communicating with said opening between said first pair of legs, said central portion defining said first slot to have a widened middle area extending to a point intermediate said open end and said closed end, said first slot having a seating area located between said widened middle area and said closed end, said seating area being narrower than said middle area;
   a first set of wedging surfaces at opposite sides of said slot, said first wedging surfaces inclined toward said end flanges from said widened middle area toward said closed end;
   a rectilinear locking flange integrally formed with said plate from metal removed from said first slot, said locking flange disposed between said first pair of upstanding legs and extending generally from said second end flange upwardly at an angle to said first central portion to a point short of and slightly below said first slot closed end adjacent said seating area, said locking flange having a locking end wider than said seating area so as to prevent said locking end from passing through said first slot, to permit an expanded head of a first stud to pass the end of said locking flange as it passes into said closed end, but to prevent removal of said first stud from said closed end past said locking flange without first depressing said locking flange; and where a first stud having a head larger than said first slot, when positioned within said first slot, will be drawn downwardly toward the planes of said end flanges as said first stud is moved relative to said clip in a direction from said open end to said closed end, and locked in position.

9. A clip as defined in claim 8, further comprising a first solid wall portion extending upwardly from said second end flange and joining said second end flange to said first pair of spaced upstanding legs, said first solid wall portion extending above said second flange a sufficient distance to provide substantial strength between said wall portion and said second end flange; and said locking flange extending from the top of said first solid wall portion.

10. A clip as defined in claim 9, wherein said locking end of said locking flange is the same width as said widened middle area of said first slot.

11. A clip as defined in claim 8, 9 or 10, further comprising:

a second central portion in the general plane of said first central portion and joined to said second end flange at one end thereof through a second solid wall member, said metal plate having a third end flange, said second central portion joined to said third end flange at the end opposite said second solid wall member through a second pair of spaced upstanding legs forming an opening therebetween;

a second slot formed in said second central portion, said second slot having a closed end and an open end, said closed end being at a point intermediate the ends of said second central portion and said open end extending to and communicating with said opening between said second pair of upstanding legs;

a second set of wedging surfaces at opposite sides of said second slot, said second wedging surfaces being inclined toward said end flanges from a point near said open end toward said closed end; and whereby a second stud having a head larger than said second slot, when positioned within said second slot, will be drawn downwardly toward the plane of said end flanges as said second stud is moved relative to said clip in a direction from said open end of said second slot to said closed end.

12. A clip according to claim 11, wherein said second wedging surfaces taper inwardly from a point near said open end of said second slot toward said closed end, said wedging surfaces having shoulders a short distance from said closed end to form a widened stud receiving area;

whereby a second stud having a head larger than said second slot, when positioned within said second slot, can be received through said slot into said widened receiving area, and said shoulders of said second wedging surfaces will resist the removal of said second stud from said receiving area.

13. A joint structure comprising:

a first furniture member and a second furniture member having surfaces in contacting relationship;

said first furniture member having a recessed area along a first contact surface in contact with said second furniture member;

a clip fastened in said recessed area, said clip being constructed according to claim 8, 9 or 10 with said first and second flanges being fastened to the bottom of said recess and said central portion being spaced above the bottom of said recess in close proximity to but below the plane of said first contact surface;

a first stud member fixed in said second furniture member, said second furniture member having a second contact surface in contact with said first furniture member, said first stud having an enlarged head extending above and spaced from said second contact surface and juxtaposed to said recessed area of said first furniture member, said first stud enlarged head being positioned beneath said central portion within said seating area of said slot so as to lockingly hold said first and second furniture members in contact with each other.

14. A joint structure comprising:

a first furniture member and a second furniture member having surfaces in contacting relationship;

said first furniture member having a recessed area along a first contact surface in contact with said second furniture member;

a clip fastened in said recessed area, said clip being constructed according to claim 11 with said first, second and third end flanges being fastened to the bottom of said recess and said central portion being spaced above the bottom of said recess in close proximity to but below the plane of said first contact surface;

a first stud member fixed in said second furniture member, said second furniture member having a second contact surface in contact with said first furniture member, said first stud having an enlarged head extending above and spaced from said second contact surface and juxtaposed to said recessed area of said first furniture member, said first stud enlarged head being positioned beneath said central portion within said seating area of said first slot so as to lockingly hold said first and second furniture members in contact with each other;

a second stud member fixed in said second furniture member said second stud having an enlarged head extending above and spaced from said second contact surface and juxtaposed to said recess area of said first furniture member, said stud enlarged head being positioned beneath said second central portion within said second slot so as to strongly hold said first and second furniture members in contact with each other.

15. A method of manufacturing a clip for use in a joint structure comprising the steps of:

cutting a configured tab from a blank or flat metal stock, said tab having a narrow free end and a wider connecting area, said wider area having a width wider than the width of said narrow free end;

cutting off said narrow free end from said tab so that said tab terminates in said wider area to provide a locking flange locking end; and bending said blank to form a locking flange from said tab and a central portion spaced from an end flange such that said central portion includes a narrow slot area corresponding to said narrow end of said tab and a wider slot area corresponding to the wider area of said tab;

said forming of said locking flange including bending said tab upwardly from the general plane of said end flange such that said locking end is positioned immediately under said narrow slot area of said central portion.

16. The method described in claim 15 wherein:

said tab cutting step includes cutting an elongated slot in said blank;

said bending step further comprises bending said blank to form a second central portion and middle flange, said central portion being generally in the same plane as said first central portion, said middle flange generally in the same plane as said end flanges and connecting said central portions, said blank being bent so that at least a portion of said elongated slot is included in said second central portion.

17. The method of claim 15 which further includes cutting an intermediate area joining said narrow free end and said wider area; and bending said central portion from said blank such that an intermediate area corresponding to intermediate area of said tab is included between said narrow slot area and said wider slot area.

18. A method for making a clip for use in a joint structure comprising:

cutting a configured tab having a free end in a metal blank; and bending said blank to form a securing flange and a raised central portion joined to said securing flange and including a slot defined by the outline of at least a portion of said tab and having a narrow slot portion which is narrower than said free end;

said bending including positioning said configured tab at an angle to said slot with its free end immediately adjacent said narrow slot portion to form a locking flange.

19. A clip for use in a joint structure comprising:

a unitary, one piece plate having an end flange means for securing the clip in a joint structure;

a first central portion generally in a plane spaced from the general plane of said end flange means, and having joining means for joining said end flange means to said central portion;

first slotted means for receiving the head of a securing stud in said first central portion, said slotted means including a slot with a closed end and seating means for seating the head of a securing stud in said slotted means;

inclined means for drawing a securing stud downwardly when the stud is moved along the slot toward the closed end;

a locking flange integrally formed with said plate from material separated from said slot and extending generally from said end flange means at an angle to said slotted means, said locking flange terminating at a locking end adjacent said seating means and at a distance from said central portion less than the thickness of a securing stud head, said locking end being wider than the width of said slotted means at said seating area whereby the head of a securing stud can depress and pass said locking end of said locking flange as it passes toward said closed end of said slot but is prevented from returning past said locking end when moving away from said closed end such that slippage of the locking end of said locking flange through said slot is prevented and slippage in and/or loosening of any joint in which the clip is used is reduced and/or prevented.

20. A clip as defined in claim 19, said slotted means having an intermediate slot area communicative with a narrow slot area, said narrow area being adjacent said closed end;

said seating means including a portion of said narrow slot area; and said locking end being substantially the same width as said intermediate slot area, said locking end being adjacent said narrow slot area.

* * * * *

UNITED STATES PATENT AND TRADEMARK OFFICE
CERTIFICATE OF CORRECTION

PATENT NO. : 4,470,716
DATED : September 11, 1984
INVENTOR(S) : Montgomery J. Welch It is certified that error appears in the above-identified patent and that said Letters Patent is hereby corrected as shown below:

Column 6, line 36:

"screw 60" should be --screws 60--

Column 8, line 27:

"incorported" should be --incorporated--

Signed and Sealed this

Nineteenth Day of March 1985

[SEAL]

Attest:

DONALD J. QUIGG

Attesting Officer — Acting Commissioner of Patents and Trademarks